United States Patent Office 3,310,387
Patented Mar. 21, 1967

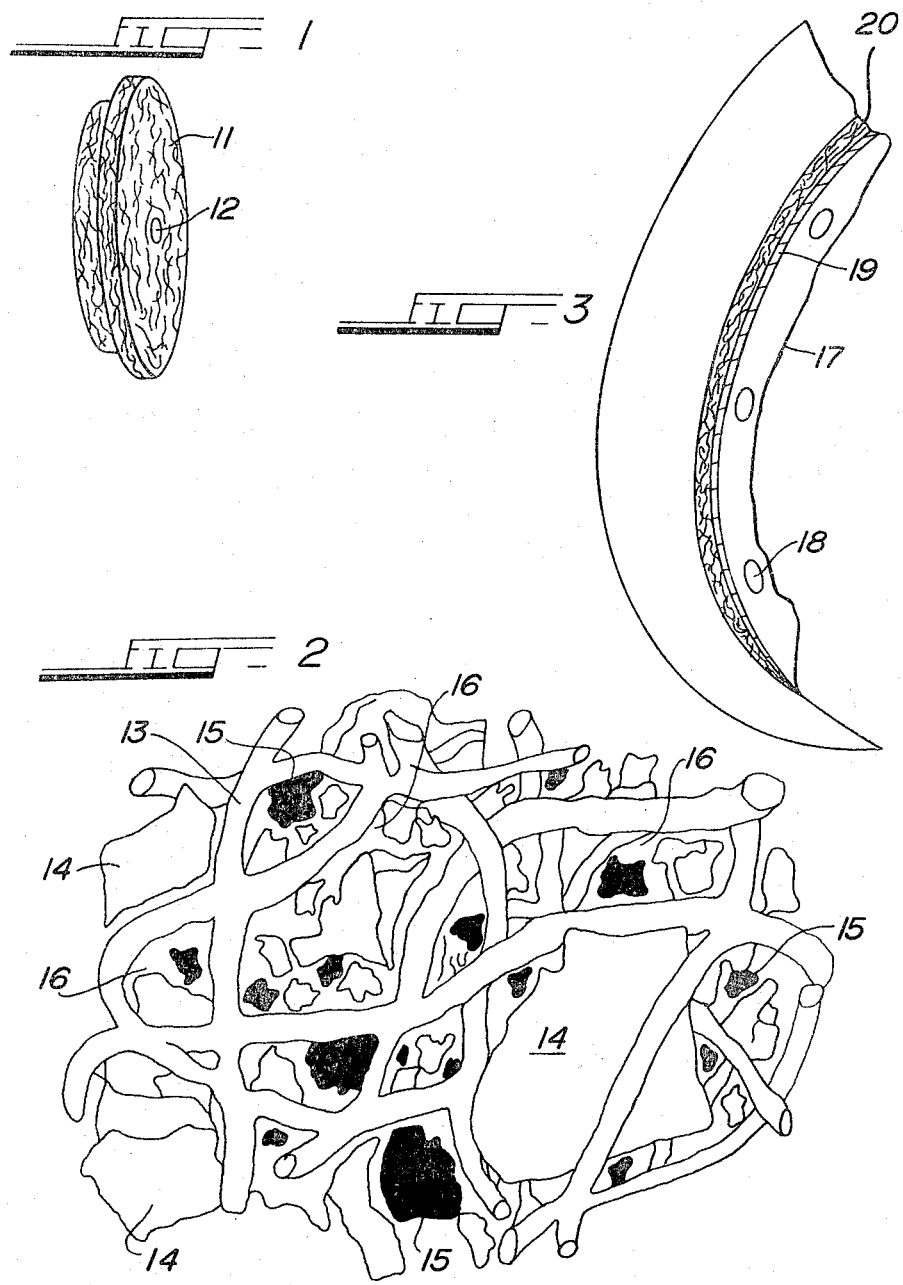

3,310,387
BRAKE LINING MATERIALS AND ARTICLES MADE THEREFROM
Cord H. Sump, Chatanooga, Tenn., and Sherwood W. McGee, Lisle, Ill., assignors to IIT Research Institute, Chicago, Ill., a corporation of Illinois
Continuation of abandoned application Ser. No. 51,709, Aug. 24, 1960. This application Jan. 4, 1965, Ser. No. 425,109
6 Claims. (Cl. 29—182.5)

The present application is a continuation of our copending application Ser. No. 51,709, filed Aug. 24, 1960, and now abandoned, which is in turn a continuation-in-part of our copending application, Ser. No. 671,992, filed July 15, 1957, and now abandoned.

The present invention relates to brake lining and other frictional materials, and more particularly to such materials formed of a composite comprising randomly oriented bonded metal fibers and ceramic materials. It further relates to articles such as brake shoes fabricated from such composites. In the compositions produced in accordance with our invention, at substantially all points of contact between metal fibers, autogenous, or metal-to-metal bonds are produced, and in a major portion of the material, where contact permits, metal-to-ceramic bonds are also present. The fibers extend in all directions within the composition and form a random three dimensional array. In some of our compositions there are essentially only two ingredients, namely the metal fibers and a single ceramic constituent, in which case the ceramic is bonded directly to the metal whereas in others of our compositions a third ingredient, primarily another ceremic type material, is added to assist and take part in the various bond formations requisite of the instant materials. Additionally, in those instances where required, a lubricant material may be incorporated within our compositions.

Along with the development of high speed transportation, particularly aircraft, a need has resulted for brake lining materials which are capable of withstanding high temperature operation while maintaining their physical structure and functional abilities. This is particularly true for jet aircraft braking systems for the landing speeds involved are far greater than anything hithertofore known with consequent high degree of brake burn-out, destruction and system failure. We have developed new compositions which illustrate remarkably good thermal stability accompanied by excellent braking and frictional properties which are particularly good for aircraft use.

It is, therefore, an object of the instant invention to provide improved brake lining materials capable of sustained operation at high temperature.

Another object of our invention is to provide brake shoes and the like made from such compositions.

Another object of the instant invention is to provide brake lining materials having excellent thermal and mechanical stability which are formed of refractory or semi-refractory metal fibers and refractory ceramic materials, such metal fibers being characterized by having metal-to-metal (i.e., autogenous) bonds at their points of junction and such material being further characterized by having metal-to-ceramic bonds, and wherein both types of bonds extend in all directions to form a three-dimensional network.

A further object of the instant invention is to provide brake lining materials having a randomly oriented bonded fiber metal skeletal structure.

Other objects, features and advantages of the instant invention will be obvious to those skilled in this particular art from the following detailed disclosure hereof and the accompanying drawings.

In producing these novel frictional materials we have used various refractory and semi-refractory metals selected from Groups IV through VII of the periodic table. Metals such as molybdenum, vanadium, nickel, titanium, iron, tantalum, zirconium, niobium, thorium, cobalt, chromium and tungsten, either singly or in combination, may all be used to form the fiber metal skeleton or framework of the instant materials. Furthermore, useful fibers may also be selected from alloys of such metals having melting points above 2000° F. as for example, those composed of 70% titanium and 30% molybdenum, or 50% titanium and 50% vanadium, or stainless steel.

At the onset it should be understood that by the term "metal fiber" is meant elongated metal bodies having discrete, limitational lengths, the actual dimensions thereof being determined in part by factors such as the sizes of the formation vessel and of the end product itself. In the terminology of the fabric fiber industry "staple," or fairly short fibers, as compared with very long filaments, are used in the practice of the instant invention.

Even more specifically, as employed in the present specification and claims, by the term "fiber" is meant an elongated metallic body having a long dimension substantially greater than its mean dimension in cross section. As a general rule for applicability herein, a fiber should have a length at least about ten times its mean dimension in cross section. Such latter term is related to the shape of the fiber in cross section and refers to the diameter of the cross section in the case of a circular fiber, or in the case of a rectangular sectioned member denotes one-half the sum of the short side and the long side of the rectangle. The ratio of fiber length to its mean dimension in cross section may vary from ten to one to 500 to one.

We have achieved particularly good results in forming the present brake lining materials by employing metal fibers having a diameter of 0.00025 inch to 0.010 inch, and lengths varying from about 0.02 inch to two inches. In order to achieve a randomly oriented fiber metal skeleton, care should be taken to employ fibers having lengths of two inches or less. Beyond such maximum length value, one enters into the area of the metal wools, which consist of rather long length filaments and which are not useful in forming the desired random metal fiber arrays. The metal wool filaments cannot be randomly felted.

In the drawings:
FIGURE 1 illustrates a friction element for a disc brake produced in accordance with the instant invention;
FIGURE 2 illustrates a microscopic view of the instant frictional material structure, said view being enlarged approxiamtely 200 diameters; and FIGURE 3 a typical brake shoe produced in accordance with the instant invention.

As illustrated in FIGURE 1, the friction element has a rubbing surface 11 which presents a discrete, staple fiber appearance. A hole 12, is bored through the axis of the element to permit mounting for operation use.

In FIGURE 2, the actual structure of the instant materials is best seen. This is composed of a metal fiber skeleton 13, for example, of molybdenum, such skeleton comprising relatively short length metal fibers of the size above noted, autogenously bonded at points of contact, and further, being bonded to ceramic and carbon materials either directly, or through an intermediate bonding agent. In the drawing the ceramic particles are indicated by the numeral 14, and the carbon granules by 15. The numeral 16 represents the intermediate bonding agent, as for example, ferrosilicon. This intermediate bonding agent effectively bonds the ceramic materials to the metallic skeleton.

In FIGURE 3 is seen a brake shoe produced in accordance with the instant invention. This has a support member 17, having rivet holes 18 therein for mounting purposes. A steel plate 19, or the like, is superimposed upon the support member, and located upon such plate is the skeletal fiber friction element 20.

It is known in this art that the so-called "cermets" may be used as frictional materials, but in most cases this term deals primarily with metal powder-ceramic combinations which as a practical matter do not have the mechanical stability illustrated by the compositions of the instant invention. To the best of our knowledge nowhere does the prior art indicate the usage of autogenously bonded metal fibers, particularly in a continuous phase, and the superior frictional materials so produced. Although the products of the instant invention may be categorized as cermets generally for they do consist of a metal-ceramic combination, in view of their superior properties, they should be considered as a special material thereunder.

We have found that the use of autogenously bonded metal fibers greatly improves the frictional and brake lining characteristics of a cermet. Among other things, there is a change in the failure characteristics of such bodies when subjected to compressional stresses. Instead of the typical brittle fracture found within the usual, i.e., powder-metal cermet material, in the instant invention there is an apparent ductile yielding upon compression loading. Because of the presence of the fibers, an incomplete microfracture occurs rather than the complete separation of materials. As a result of the autogenous bonds in combination with the fibrous structure, the entire mass tends to hang together even despite severe stresses. Along this line also, the presence of a ductile metallic phase in metal fiber form reduces local stress concentrations and in this manner further inhibits the propagation of cracks within the fiber metal-ceramic body. In various tests performed to explore the effects of thermal shock on the instant compositions, we found that the metal fibers promote a manyfold resistance to such shock. This improvement apparently stems from at least two sources, viz., first, crack propagation is arrested by the presence of the ductile fibers, and second, the continuous phase fibers form a heat conductive path through the ceramic material and thus reduce the thermal gradient from the surface to the core of the structure. With such reduction in the thermal gradient thermally incurred stresses in the body are likewise reduced so it can necessarily better withstand the temperature changes to which it is subjected. Still another contribution of metal fibers to such improved cermet materials is the much greater oxidation resistance of the latter. We observed that for equivalent compositions of metal powder cermet and molybdenum fiber cermet that the rate of oxidation attack in an identical high temperature environment is much slower for the bonded fiber material.

The metal fiber cermets illustrate improved toughness and resiliency when compared with the powder metal. Such characteristics are particularly evident when the ductility of the fiber is retained, as for example, when nickel fibers are used the resultant material illustrates extreme resistance to fragmentary separation under compressive loading—each ceramic fragment is held attached by the fibrous metal structure. Our materials are caused to disintegrate only after extreme difficulty. Even in these instances where an entire ceramic phase has been broken by mechanical damage, the fiber structure is still retained. The resiliency factors are, of course, of the utmost importance when the instant materials are utilized for frictional purposes. There are secondary effects here, such as improved damping properties which are related to chatter and other mechanical difficulties currently encountered in friction materials.

In brake lining materials made in accordance with our invention microstructural changes are possible in the placement of the ceramic constituent whereas in powder cermets, because of their inherent geometry, such placement changes are not possible.

In order to obtain the superior properties of the instant materials, it is essential that the metal fibers be welded to each other at their points of contact, i.e., autogenous bonds must be formed substantially throughout the entire brake lining mass. Such a weld, or bond is quite similar to the bond developed when metal powders are sintered and may be defined as a sintered bond. Once the skeletal network has been formed, the ceramic phase may be introduced by such techniques as infiltration or slip casting; however, in most instances, the metal fiber skeleton is formed simultaneously with the formation of the ceramic components.

Metal fiber skeletons, useful with the present invention, may be formed by first felting the constituent fibers through air into a mold or suitable container having the form of the final composite in cross section. In this condition the fibers form a weakly coherent mass which is transferred to a furnace provided with a non-oxidizing atmosphere. The mass is then heated to its sintering temperature, i.e., approximately 80% to 90% of the melting point of the metal—to result in the formation of strong metallic bonds at points of fiber content. The ceramic phase is then introduced into the fiber metal pores by such techniques as passing a ceramic slurry therethrough.

Another important requirement of the instant composition is the necessity for a strong bond between the ceramic and the metal. If such metallic-ceramic bond is not present, failure oftentimes occurs at the interface therebetween primarily because such interface acts as the stress concentration area. This type of bond is also important in order that the ceramic may take full advantage of the conductive properties of the continuous metallic phase; without the intimacy of contact there is poor heat transfer through the material mass.

In order that our invention may be fully understood, the following specific examples of compositions made in accordance therewith are presented. These mixtures were used to prepare one-quarter inch thick buttons of two inch diameter for a disc brake, as shown in FIGURE 1. For other size buttons, of course, the fiber length could be varied.

*Example I*

Kinked molybdenum fiber 0.003
  inch to 0.008 inch diameter,
  1½ inch lengths _____ 50% by vol. or 77.8% by weight.
Green silicon carbide, −35 +48
  mesh _____ 30% by vol. or 14.6% by weight.
Ferrosilicon containing 15% by
  weight iron, −100 mesh ____ 10% by vol. or 4.1% by weight.

Example I—Continued

Carbon, calcined refined Texas Petroleum Coke, −72 +100 mesh _____ 10% by vol. or 3.5% by weight.

The molybdenum fiber as received was bundled and cut by shearing to the required length. The cut fiber was tumbled in a drum to produce kinking but the formation of tight fiber clumps was avoided. At this point, no bonds were present between the constituents and the structure supported itself by mere mechanical interlocking. The preformed compact thus formed was placed in a graphite die and hot pressed at 2500° F. and 6000 p.s.i. pressure. The simultaneous application of heat and pressure in the process of hot pressing insures the establishment of metal-ceramic bonds.

The hot pressing is performed by confining the preformed article within a die, heating it to a temperature at which the ceramic is surface active so that bonding can occur and then applying pressure at that temperature. Temperatures between 2500° F. and 3200° F. and pressures of 6000 p.s.i. have been successfully employed.

The properties of the end product depend upon the time permitted to raise the mass to this temperature and the interval during which it is held at such elevated temperature. The hot pressed compact may be machined, ground or lapped at the expiration of such operation.

Example II

Titanium wool, 0.003 inch to 0.010 inch diameter, 0.5 inch lengths _____ 50% by vol. or 61.4% by weight.
Green silicon carbide, −35 +48 mesh _____ 30% by vol. or 26.0% by weight.
Silicon, −100 mesh _____ 10% by vol. or 6.5% by weight.
Carbon, calcined refined Texas Petroleum Coke, −72 +100 mesh _____ 10% by vol. or 6.1% by weight.

In this mixture the procedure for forming is the same as that for Example I except that hot pressing is performed at 2650° F.

We found that there are practically no limitations as to the type of manufacturing process which yields the metal fibers useful in the instant invention, and either cut wire or cut wire wool may be used. In many cases our experimental linings utilized fibers cut by merely bundling masses of metal wire and/or wool and then shearing to the desired length. There are however, certain characteristics or requirements of the utilizable fibers which should be obtained in order to have the superior end products hereof, to wit:

(1) The fibers should preferably have a diameter of from 0.0003 to 0.010 inch.

(2) The fibers must be of a feltable length to deposit as a randomly oriented three-dimensional array. The critical length limitations have been set out above.

(3) Optimum properties are achieved when the fibers are "kinked." By this is meant that the directional orientation of each fiber is changed at least three times along its longitudinal axis. Such kinking improves the frictional properties by contributing mechanical interlocking of the fibers themselves and the fibers to the non-metallic additives. In service, the kinked fiber retains the non-metallics of the lining more effectively than a straight length fiber. Additionally, improved uniformity of the friction blend results from this kinked condition.

(4) It is apparently essential that the ductility of the metal fiber be retained during the manufacture of the lining. By ductility is meant the ability of individual fibers to be permanently bent without breaking.

Many ceramic materials may be utilized with the bonded metal fibers to produce the instant frictional materials. Certain ceramic characteristics should also be provided, as for example:

(1) The ceramic must be capable of being bonded to the metal fiber during the manufacturing process, either directly or through the use of an intermediate bonding agent as cited previously.

(2) Softening temperature should be as high as possible, subject of course to the bondability requirement. For example, mullite, $(3Al_2O_3.2SiO_2)$, has a higher softening temperature than silica alone and is found to produce a more satisfactory brake lining. On the other hand, $Al_2O_3$ has a higher softening temperature than mixtures thereof with silica but there is greater difficulty in establishing satisfactory bonding to the metal fibers.

(3) Coarser particles, i.e., in the range of from −35 to +48 mesh are preferred over the finer fractions.

In some of the instant brake lining compositions it is desirable to add lubricating agents to the fiber metal-ceramic mass. For example, we have used lead, molybdenum, disulfide, and various forms of carbon for this purpose. As above indicated, in many cases, carbon is added to the raw material charge. Crushed calcined petroleum pitch coke of from −72 to +100 mesh was used extensively, and we found also that graphite of the same particle size was quite useful.

Mixtures of alumina and silica were used in practically all proportions to study their friction characteristics and in many cases such mullite compositions having particle sizes of from −35 to +48 mesh were used.

We found that the best brake lining materials have the non-metallic constituents composed of silicon carbide in conjunction with silicon or ferrosilicon, and additionally, in many instances, a form of carbon. Preferably, the particle size of the crushed carbide is from −35 to +48 mesh. For our purposes, crushed green, electric furnace silicon carbide was used almost exclusively, it of course being understood that other types of like material from other sources may be used. Silicon or ferrosilicon of approximately −200 mesh yields excellent end products. Such silicon and/or ferrosilicon not only bonds the carbide particles into essentially a continuous phase, but additionally bonds the silicon carbide, and, where used, carbon, to the metal fibers.

It should be understood that the bonding of silicon carbide with silicon or ferrosilicon does not result in an equilibrium mixture. For this reason the heating time and the temperature employed in the manufacture of the instant materials are selected in order to retain as much of the original carbide and metal fiber as is practical. Heterogeneity is desirable, rather than a fully fused ceramic constituent.

The use of the silicon or ferrosilicon stems from the inability, in some cases, of the metal fiber to properly surround the ceramic particles and hold them in place. If, for example, molybdenum fibers are used to reinforce silicon carbide, the silicon or ferrosilicon additive is necessary. Since silicon forms compounds with both carbon and molybdenum, it provides a means of bonding these materials to withstand severe braking service. Examination of microstructures of Examples I and II above shows that intermediate phases exist between metal fiber and silicon (or ferrosilicon). The silicon was in intimate contact with the silicon carbide granules, having wet them, and thus assists in their firm support in the lining matrix. We also found that metal powders or films may be employed as additional bonds to obtain intimate contact between the metal and ceramic granules.

A few test results of the instant brake lining materials are as follows:

| Friction Material | Type of Test | Test Results |
|---|---|---|
| By volume, 50% molybdenum fiber, 30% SiC, 10% Fe-Si, 10% carbon, as cited under Example I. | Inertia type dynamometer, for use with full size aircraft disc brake. 50 or more stops required to destruction for qualifying performance. | A total energy of 4,560,000 foot pounds per square inch of lining surface was dissipated in 94 stops with 0.00007 inch to 0.00006 inch per stop lining wear. Linings were still in serviceable condition after testing. Coefficient of friction ranged from 0.11 to 0.15. Temperatures from 1,800° to 2,000° F. were estimated during these tests. This friction material was found to be compatible with steel and titanium alloy mating members. |
| By volume, 70% titanium fiber, 20% (3Al₂O₃+2SiO₂), 10% carbon, 78.7%, 15.7% and 5.6% by weight, respectively. | Inertia type dynamometer, for use with full size aircraft disc brake. 50 or more stops required to destruction for qualifying performance. | A total energy of 103,000 foot pounds per square inch of lining surface was dissipated in 5 stops. This friction material was found to be compatible with steel mating members. Average lining wear was 0.0005 inch per stop, friction coefficient 0.25. |
| By volume, 50% molybdenum fiber, 30% SiC, 10% silicon, 10% carbon, 78.7%, 14.6%, 4.1% and 3.5%, respectively. | Drag type dynamometer test capacity 108,000 ft.-lb./min./in.² speed 1,840 f.p.m. | A 15 minute drag test at an average energy absorption rate of 94,100 foot pounds per square inch per minute was completed. The friction material was still serviceable after the test. Wear rate was less than 0.00002 inch per minute. Temperature during test was 1,740°–1,780° F. Coefficient of friction was 0.19 to 0.22. |
| Resin Base Standard Control Lining. This lining was tested in conjunction with a titanium alloy mating member. | Inertia type dynamometer for use with full size aircraft disc brake. 50 or more stops required to destruction. Tested using titanium alloy mating member. | A total energy of 135,200 foot pounds per square inch of lining surface was dissipated in three stops. Linings were destroyed at this point. Lining wear in this test was 0.180 inch per stop. Under conventional conditions with steel mating members, these linings will last 50 stops. Lining wear being about 0.002 inch per stop. |

All fiber metal compositions shown in the preceding table were prepared by the blending operation described above and were then hot pressed using carbon punches and graphite dies. The molybdenum fiber compositions were hot pressed at 2500° F. while that containing the titanium fibers was hot pressed at 2650° F.

The metal fibers should be present in amounts ranging from 20% to 80% by volume, with the preferred amount being 50%, the remainder being the other constituents. The primary ceramic constituent ranges from 20% to 80% by volume also.

It will be understood that modifications and variations may be effected without departing from the spirit or scope of the novel concepts of our invention.

We claim as our invention:

1. A friction material consisting essentially of: a substantially autogenously bonded, randomly oriented, fiber metal support, each fiber of said support being kinked and having a length ranging from 0.002 to 2.0 inches, a mean dimension in cross section of from 0.00025 to 0.01 inch, and a length to mean dimension in cross section ratio of at least 10 to 1, said fiber metal being selected from the group consisting of molybdenum, vanadium, nickel, titanium, iron, tantalum, zirconium, niobium, thorium, cobalt, chromium and tungsten, and alloys and mixtures thereof, said fiber metal support comprising 20% to 80% by volume of said friction material, and a refractory ceramic comprising the balance thereof, said refractory ceramic being bonded to said fiber metal support by a material selected from the group consisting of silicon and ferrosilicon.

2. A friction material consisting essentially of: a substantially autogenously bonded randomly oriented, fiber metal support, each fiber of said support being kinked and having a length ranging from 0.002 to 2.0 inches, a mean dimension in cross section of from 0.00025 to 0.01 inch, and a length to mean dimension in cross section ratio of at least 10 to 1, said fiber metal being selected from the group consisting of molybdenum, vanadium, nickel, titanium, iron, tantalum, zirconium, niobium, thorium, cobalt, chromium and tungsten, and alloys and mixtures thereof, said fiber metal support comprising 20% to 80% by volume of said friction material; a refractory ceramic bonded to said fiber metal support by a material selected from the group consisting of silicon and ferrosilicon, and a lubricating agent enmeshed in said fiber metal-ceramic support.

3. A friction material consisting essentially of: a substantially autogenously bonded, randomly oriented, fiber metal support, each fiber of said support being kinked and having a length ranging from 0.002 to 2.0 inches, a mean dimension in cross section of from 0.00025 to 0.01 inch, and a length to mean dimension in cross section ratio of at least 10 to 1, said fiber metal being selected from the group consisting of molybdenum, vanadium, nickel, titanium, iron, tantalum, zirconium, niobium, thorium, cobalt, chromium and tungsten, and alloys and mixtures thereof, said fiber metal support comprising from 20% to 80% by volume of said friction material, the balance consisting of a refractory ceramic, said refractory ceramic being directly bonded to said fiber metal support.

4. A friction material consisting essentially of: a substantially autogenously bonded randomly oriented fiber metal support, each fiber of said support being kinked and having a length ranging from 0.002 to 2.0 inches, a mean dimension in cross section of from 0.00025 to 0.01 inch, and a length to mean dimension in cross section ratio of at least 10 to 1, said fiber metal being selected from the group consisting of molybdenum, vanadium, nickel, titanium, iron, tantalum, zirconium, niobium, thorium, cobalt, chromium, and tungsten, and alloys and mixtures thereof, said fiber metal support comprising from 20% to 80% by volume of said friction material, the balance consisting of a refractory ceramic, said refractory ceramic being directly bonded to said fiber metal support, and a lubricating agent enmeshed in said fiber metal-ceramic support.

5. A fiber metal ceramic support as set forth in claim 4 wherein said lubricating agent is carbon.

6. A fiber metal ceramic support as set forth in claim 4 wherein said lubricating agent is molybdenum disulphide.

References Cited by the Examiner

UNITED STATES PATENTS

| | | | |
|---|---|---|---|
| 2,898,216 | 8/1959 | Bray et al. | 29—182.5 |
| 2,903,787 | 9/1959 | Brennan. | |
| 3,114,197 | 12/1963 | Du Bois et al. | |
| 3,127,668 | 4/1964 | Troy | 29—182 |
| 3,153,279 | 10/1964 | Chessin. | |

FOREIGN PATENTS 733,061   7/1955   Great Britain.

CARL D. QUARFORTH, *Primary Examiner.*

L. DEWAYNE RUTLEDGE, *Examiner.*

R. L. GRUDZIECKI, *Assistant Examiner.*